United States Patent
Adachi

(10) Patent No.: US 9,418,278 B2
(45) Date of Patent: Aug. 16, 2016

(54) IMAGE ANALYSIS METHOD, CAMERA APPARATUS, CONTROL APPARATUS, CONTROL METHOD AND STORAGE MEDIUM

(71) Applicant: CANON KABUSHIKI KAISHA, Tokyo (JP)

(72) Inventor: Keiji Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 249 days.

(21) Appl. No.: 14/224,345

(22) Filed: Mar. 25, 2014

(65) Prior Publication Data

US 2014/0300746 A1 Oct. 9, 2014

(30) Foreign Application Priority Data

Apr. 8, 2013 (JP) ................ 2013-080839

(51) Int. Cl.
*H04N 5/77* (2006.01)
*G06K 9/00* (2006.01)
*G06T 7/00* (2006.01)
*G06T 7/20* (2006.01)

(52) U.S. Cl.
CPC ........ *G06K 9/00362* (2013.01); *G06K 9/00771* (2013.01); *G06T 7/0044* (2013.01); *G06T 7/2093* (2013.01); *G06T 2207/20076* (2013.01); *G06T 2207/30196* (2013.01); *G06T 2207/30201* (2013.01); *G06T 2207/30232* (2013.01); *G06T 2207/30244* (2013.01); *G06T 2207/30252* (2013.01); *G06T 2207/30268* (2013.01)

(58) Field of Classification Search
CPC .......... G06K 9/00362; G06K 9/00771; G06T 7/004; H04N 7/181
USPC .......... 348/159, 143, 153; 386/200, 224, 223, 386/226, 230, 239, 248
See application file for complete search history.

(56) References Cited

U.S. PATENT DOCUMENTS

| | | | | |
|---|---|---|---|---|
| 7,991,220 B2 * | 8/2011 | Nagai | ................. | A63F 3/00643 345/633 |
| 8,780,198 B2 * | 7/2014 | McClure | ............ | G08B 13/1961 348/143 |
| 2005/0057653 A1 | 3/2005 | Maruya | | |

FOREIGN PATENT DOCUMENTS

JP 2009-211311 A 9/2009

* cited by examiner

*Primary Examiner* — Robert Chevalier
(74) *Attorney, Agent, or Firm* — Rossi, Kimms & McDowell LLP

(57) ABSTRACT

A control apparatus detects a state of an object independently of results of analysis of images captured by a plurality of cameras and controls analysis of the images captured by the plurality of cameras concurrently capturing the object whose state has been detected, according to the state of the object.

30 Claims, 9 Drawing Sheets

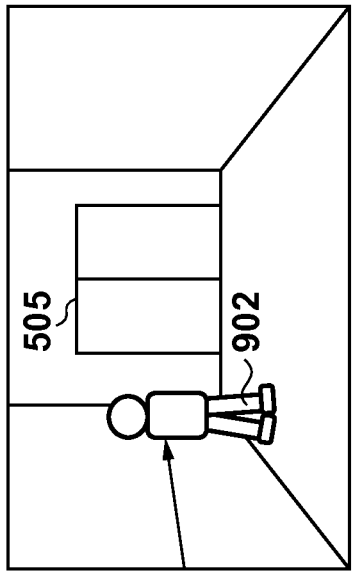
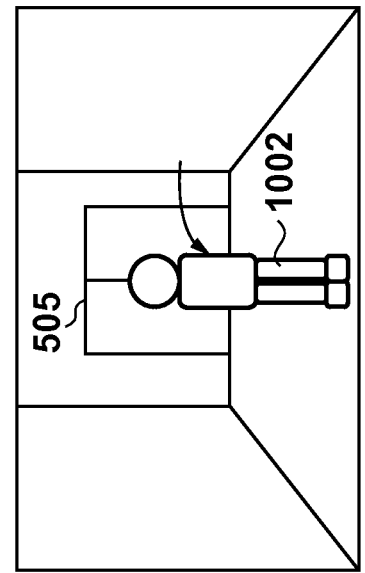
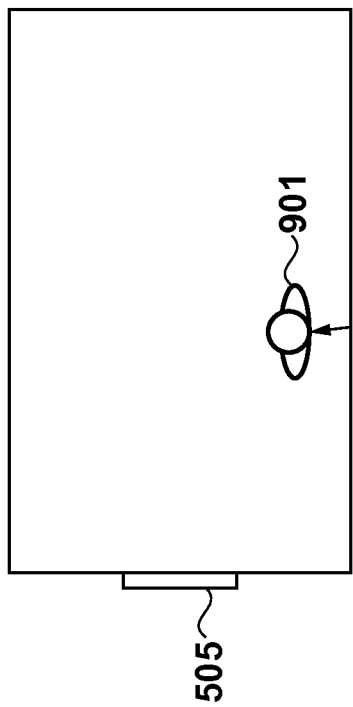
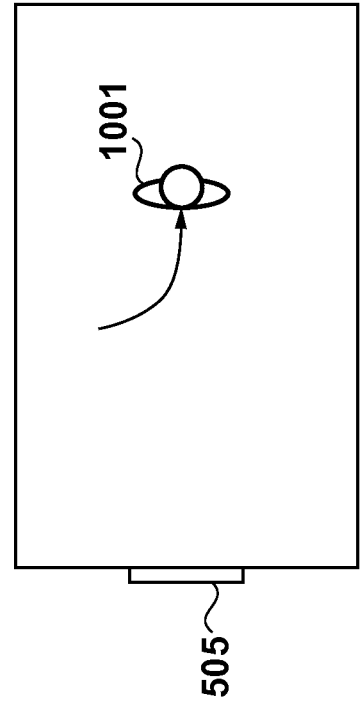

IMAGE ANALYSIS METHOD, CAMERA APPARATUS, CONTROL APPARATUS, CONTROL METHOD AND STORAGE MEDIUM

BACKGROUND OF THE INVENTION

1. Field of the Invention

The present invention relates to an image analysis method, a camera apparatus, a control apparatus, a control method and a storage medium.

2. Description of the Related Art

A conventional technique for detecting a specific target such as a face or a human body from an image captured by a surveillance camera ordinarily uses one matching pattern (dictionary) in which features of a target object (object) are stored, or a plurality of prepared matching patterns at different angles. Then, the object that matches such a matching pattern is detected from a detection target region in the image.

For example, Japanese Patent Laid-Open No. 2009-211311 discloses a technique in which a plurality of local image patterns are extracted using a matching pattern as the entire image by changing the size of the image, and a local feature amount is calculated from each local image pattern. Then, a determination is made as to whether or not the image includes a human body, from a total sum of the results obtained by weighting the local feature amounts.

Meanwhile, a system such as a surveillance system is known that includes a plurality of cameras, and tracks and monitors a moving object by using the plurality of cameras in cooperation.

Furthermore, US-2005-0057653 discloses a method for continuously tracking a moving body by extracting feature information of the moving body through image recognition while tracking and monitoring the moving body and transmitting the feature information between cameras via a network.

Under the circumstances in which network camera devices have an increased number of pixels, and in which highly accurate real-time processing is required to be performed in monitoring or the like using network camera devices, detection processing for detecting a specific object is required to be executed at a high speed.

For this reason, various methods have been proposed such as reducing the size of a processing region by selecting only a region in which there is a movement from an image as a target region area, or reducing the frequency at which detection processing is performed to a processable level by thinning out processing image frames in time series.

However, the processing load of object detection processing through pattern matching or the like is high, and thus real-time processing is not always possible.

Also, in images captured by a surveillance camera, a target subject moves in various directions and thus may take postures in various orientations. Accordingly, the processing load further increases when performing highly accurate pattern matching by using matching patterns (dictionary) regarding a plurality of orientations such as a front orientation and a side orientation.

As described above, under the current circumstances, there is a problem in that there is a trade-off relationship because in order to perform object detection processing with high accuracy, the processing load increases and the processing speed decreases, whereas in order to perform object detection processing at a high speed, the use of a low-load detection unit is required.

SUMMARY OF THE INVENTION

The present invention provides a technique for enabling image analysis to be performed with high accuracy and at a high speed.

It is an object of the present invention to provide an image analysis method for analyzing images captured by a plurality of cameras, the method including: detecting a state of an object independently of results of analysis of images captured by the plurality of cameras; and controlling analysis of the images captured by the plurality of cameras concurrently capturing the object whose state has been detected, according to the state of the object.

It is another object of the present invention to provide a camera apparatus that controls a plurality of cameras, the camera apparatus including: an image capturing unit; a detection unit configured to detect a state of an object in an image captured by the image capturing unit; and a control unit configured to control analysis of the images captured by the plurality of cameras concurrently capturing the object whose state has been detected, according to the state of the object.

It is another object of the present invention to provide a control apparatus that controls a plurality of cameras, the control apparatus including: an acquisition unit configured to acquire a state of an object detected independently of results of analysis of images captured by the plurality of cameras via a network; and a control unit configured to control analysis of the images captured by the plurality of cameras concurrently capturing the object whose state has been detected, according to the state of the object.

Further features of the present invention will become apparent from the following description of exemplary embodiments with reference to the attached drawings.

BRIEF DESCRIPTION OF THE DRAWINGS

FIG. 9A is a diagram illustrating processing of an image captured by a camera.

FIG. 9B is a diagram illustrating processing of an image captured by a camera.

FIG. 10A is a diagram illustrating processing of an image captured by a camera.

FIG. 10B is a diagram illustrating processing of an image captured by a camera.

DESCRIPTION OF THE EMBODIMENTS

Hereinafter, embodiments of the present invention will be described in detail with reference to the drawings.

An image processing apparatus according to Embodiment 1 is applicable to any image processing circuit incorporated in an image capturing apparatus such as a surveillance camera, and a computer apparatus such as a personal computer.

Figure 1:
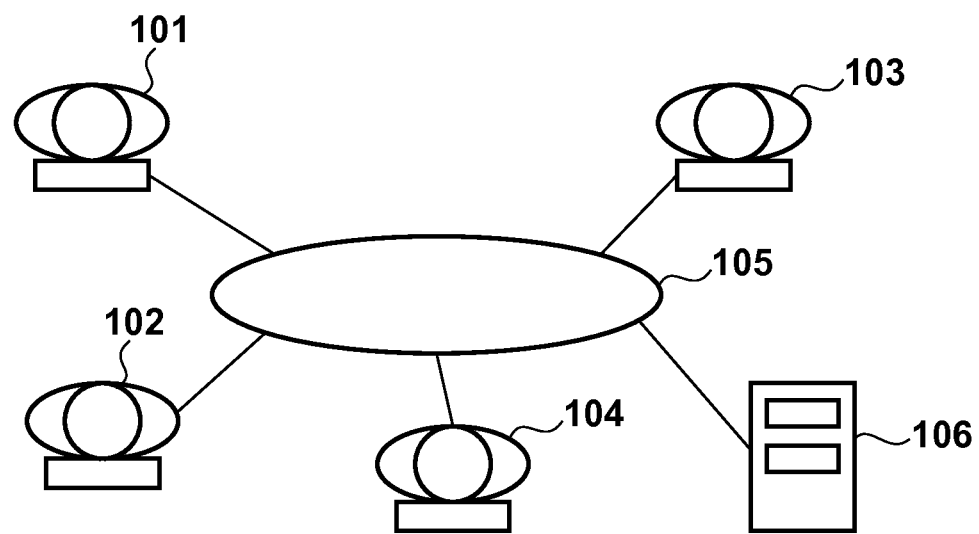
FIG. 1 is a diagram showing an example of a configuration of an image processing system.

FIG. 1 is a diagram showing a configuration of an image processing system according to Embodiment 1, which is one aspect of the present invention.

As shown in FIG. 1, reference numerals 101, 102, 103 and 104 are network cameras having various types of detection functions such as a moving object detection function, a human body detection function, and a face authentication function. Reference numeral 105 is a network. Reference numeral 106 is an information processing apparatus such as a personal computer (PC). The information processing apparatus includes ordinary constituent elements that are used in general-purpose computers (for example, a CPU, a RAM, a ROM, a hard disk, an external storage device, a network interface, a display, a keyboard, a mouse, and the like).

A PC 106 performs setting of parameters (detection processing settings) for use in detection processing in the network cameras 101 to 104, receives images from the network cameras 101 to 104, and performs display control processing on a display apparatus connected to the PC 106.

The network cameras 101 to 104 and the PC 106 are connected via a network 105. The network 105 is a network such as, for example, a local area network (LAN). In Embodiment 1, in order to simplify the description, the network camera 101 will be referred to as a "first camera", and the network cameras 102 to 104 will be referred to as second cameras (camera group).

The first camera and the second cameras have some duplicate configurations and functions, and thus all of the cameras may be configured to have the same configuration by incorporating the functions of the first camera into the second camera. Also, the first camera and the second cameras may each include a plurality of cameras.

Also, although an image processing system is used in Embodiment 1, an image processing apparatus may also be used since the same processing of acquiring images and performing image processing on each image is performed.

Next, operations (control of operations of the plurality of network cameras) performed by the image processing system will be described in detail.

Figure 2:
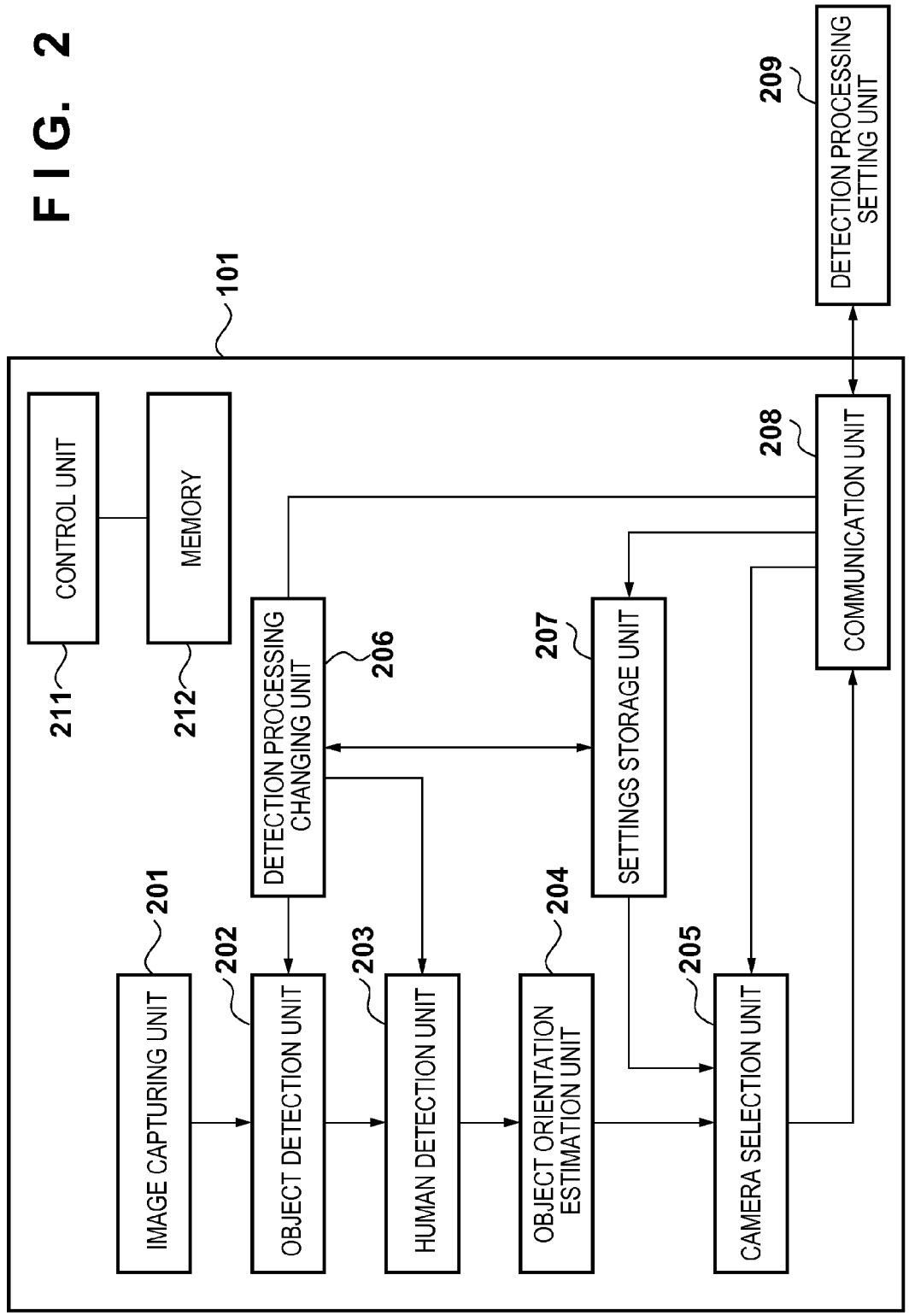
FIG. 2 is a diagram showing a functional configuration of a network camera.

FIG. 2 is a block diagram showing a functional configuration of the network camera 101 according to Embodiment 1.

In FIG. 2, reference numeral 201 is an image capturing unit composed of a lens and an image capturing element, and performs processing to transmit a captured image to an object detection unit 202. The object detection unit 202 detects, from a frame image (captured image) acquired by the image capturing unit 201, a specific object in the captured image by using a background subtraction method or the like. Information regarding the detected object includes the position of the object in the image, a rectangle circumscribing the object, and the size of the object. The processing performed by the object detection unit 202 is processing for detecting an object from an image, and thus the method is not limited to a specific method such as a background subtraction method. A human detection unit 203 detects a human body based on setting values to which detection processing settings set by a detection processing setting unit 209 are applied by a detection processing changing unit 206. Reference numeral 211 is a control unit that performs overall control on the network camera 101, and reference numeral 212 is a memory in which a program of the control unit 211, which is a computer, is held in a manner readable by the control unit 211.

As described above, the network camera 101 includes a plurality of types of detection units (first detection units) that detect an object and a human body such as the object detection unit 202 and the human detection unit 203.

An object orientation estimation unit 204 estimates as one of the states of the object (including human body) detected by the object detection unit 202 or the human detection unit 203, for example, a direction toward which the object is facing (object orientation).

A method for estimating an object orientation will now be described.

The object orientation refers either to the moving direction of an object or the direction in which an object is facing.

In a method for estimating the moving direction of an object, tracking processing of tracking a target object in the image on the screen is executed, and the direction toward which the object is moving is estimated based on the trajectory of movement of the object.

The object tracking processing will be described. In the case where the object detection unit 202 detects, from the current frame image, an object that is the same as that detected from a frame image that is previous to the current frame image, the tracking processing associates the object in the frame images. For example, if an object ID (A) is assigned to an object detected by the object detection unit 202 from a frame image previous to the current frame image, and thereafter, the same object is detected by the object detection unit 202 from the current frame image, the tracking processing assigns the object ID (A) to that object as well. In this way, in the case where the same object is detected from a plurality frame images, the same object ID is assigned to the object in each frame image. A new object ID is assigned to an object newly detected in the current frame image.

Note that the method for determining whether or not an object detected from different frame images is the same is not limited to the method described above. A configuration is also possible in which the likelihood of the feature amount of an object may be compared, and an object having a high level of likelihood may be associated. Alternatively, the determination as to whether or not the object is the same may be made based on the distance between an estimated moving position of a moving object in the (n−1)th frame image and a detected position of the object in the nth frame image, or the degree of overlapping of a region in which the object is present in the frame images.

Note that the estimation of the moving direction is not limited to the above-described method. For example, the moving direction may be estimated from an optical flow of a moving body portion in the image. Alternatively, the moving direction of the object may be estimated by tracking the object by using a sensor that can acquire the position of the object. Alternatively, the moving direction may be estimated by performing tracking processing by detecting a three-dimensional position of the moving object by using a plurality of cameras.

As the method for estimating an object orientation, there is a method in which the direction in which the object is facing is estimated as the object orientation.

As the method for estimating the direction in which the object is facing, there is a method in which the direction in which an object (human body) detected by the human detection unit 203 is facing is estimated. According to this method, upon detection of a human body, an orientation having a high level of likelihood determined by using a plurality of types of orientation-specific matching patterns (detection dictionary) is determined as the direction in which the human body is facing.

Note that the method for estimating the direction in which the object is facing is not limited to the above-described method. The direction in which the object is facing may be estimated by detecting a direction in which a face detected by face detection processing is facing. Alternatively, with the use of a sensor such as an eye sensor, a direction in which the detected face is looking may be estimated as the direction in which the object is facing.

The above has been the object orientation estimation processing performed by the object orientation estimation unit 204.

Returning to FIG. 2, reference numeral 205 is a camera selection unit. The camera selection unit 205 selects a second camera that performs detection processing according to the settings of the target detected by the image processing system with the use of the detection processing setting unit 209. Then, a communication unit 208 transmits detection processing settings to the second camera that has been selected. In the detection processing setting unit 209, for example, settings have been made to perform, in the shop in which the second camera is installed, human body detection to detect a human body, and face detection/face authentication to detect and authenticate the face of the human body.

The detection processing setting unit 209 is a detection processing setting application installed on the PC 106, and sets parameters regarding the set detection processing (detection processing settings) in the network camera 101 via a network in response to a detection processing change instruction. In this example, detection processing settings are set by the detection processing setting application installed on the PC 106, but any other method can be used such as, for example, the detection processing setting application may be installed on the network cameras so that the detection processing can be changed from another terminal via a network.

Here, positions where the cameras are installed will be described.

FIG. 3 is a diagram illustrating camera positioning in a monitored space.

Figure 3A:
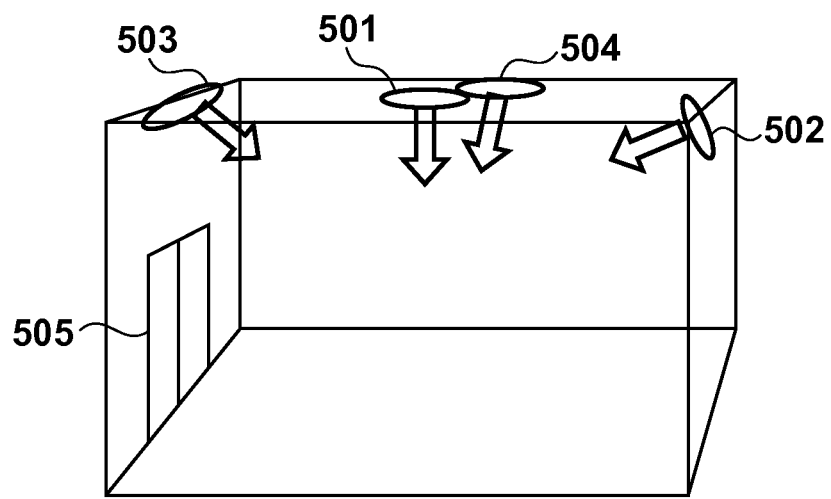
FIG. 3A is a three-dimensional view illustrating camera positioning.
Figure 3B:
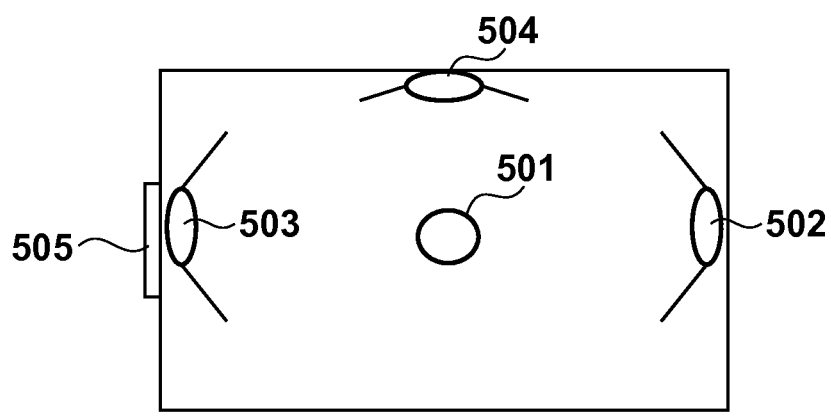
FIG. 3B is a plan view illustrating camera positioning.

FIG. 3 shows an example in which a plurality of cameras are installed in a monitored space (for example, a shop). FIG. 3A is a three-dimensional view of the monitored space, and FIG. 3B is a plan view of the same.

In FIGS. 3A and 3B, a camera 501 is an omnidirectional camera that is installed to face downward in the center of the ceiling so as to be capable of capturing movement of an object (or a human body) in the shop. A camera 502 is installed in the opposite side of a door 505 to tilt downward so as to be capable of capturing a predetermined angle (shallow angle) in the direction in which the door is provided. A camera 503 is installed above the door 505 to tilt downward so as to be capable of capturing a predetermined angle (shallow angle) in the direction in which the camera 502 is provided. A camera 504 is installed on the ceiling on the left side as viewed from the door 505 to tilt downward so as to be capable of capturing a predetermined angle (shallow angle) toward the center of the monitored space.

When FIGS. 3A and 3B are compared with FIG. 1, for example, the network camera 101 corresponds to the camera 501, and the network cameras 102 to 104 correspond to the cameras 502 to 504.

Each camera is fixed in the monitored space, and is capable of calculating a three-dimensional position of the installation position of a camera in the space by actually measuring the installation position of the camera. Then, information obtained from the installation environment such as the image capturing direction of the camera and the image capture range determined from the image capturing direction and the angle of view of the camera, and position information indicating the three-dimensional position in the space are all stored as camera installation information in a settings storage unit 207 (FIG. 2). For example, the three-dimensional position, the image capturing direction (installation direction) and the angle of view of each of the cameras 502 to 504 (the cameras 102 to 104) are input into the PC 106 by the user. The angle of view may be acquired by the PC 106 from each of the cameras 502 to 504. Then, the PC 106 notifies the camera 501 of the three-dimensional position, the image capturing direction and the angle of view of each of the cameras 502 to 504. The camera 501 (the network camera 101) determines an image capture range from the image capturing direction and the angle of view of each of the cameras 502 to 504 that have been notified from the PC 106, and then stores the determined image capture range in the settings storage unit 207 together with the three-dimensional position and the image capturing direction of each of the cameras 502 to 504. The image capture range may be calculated by the PC 106 and notified to the camera 501.

In this way, by storing, in the camera, position information regarding the three-dimensional positions of other cameras and information regarding image capturing directions of other cameras as camera installation information, a camera optimal for designated detection processing settings can be selected. For example, if the detection processing settings indicate face detection or face authentication, a camera that faces the front side of the detected human body can be selected.

Selection of a camera that faces the front side of the object can be performed by, when the camera is installed, previously associating its moving direction with the installation positions of other cameras, and then, in response to detection of a moving direction, transmitting a detection processing change instruction to a camera installed at a position corresponding to the detected moving direction.

In this example, the installation positions of the cameras are pre-set, but the configuration is not limited thereto, and any method can be used as long as it is possible to specify the installation positions of the cameras in a three dimension space. Also, the installation positions of the cameras are stationary, but movable cameras whose installation position and image capturing direction are changeable may be used. In this case, by mutually updating the camera installation information each time the image capturing direction is changed, even movable cameras can have the most up-to-date camera installation information.

Also, in Embodiment 1, as the detection processing, face detection/face authentication is performed, but it may be another detection processing. Another example of the detection processing will now be described. In the case where gait authentication for identifying individuals based on the way they walk is performed, the arm swing length, the stride length and the like are used, and it is thus desirable to perform authentication by using images captured from a side direction (perpendicular direction) with respect to the orientation (the direction of movement) of the human body. For this reason, a gait authentication instruction is transmitted only to a camera that captures the human body from a side direction.

This will be described taking FIGS. 3A, 3B and 4 as an example. It is assumed that the cameras 501 to 504 each have a gait authentication function in addition to the configuration shown in FIG. 2. If the camera 501 detects that a human body 603 is moving in a direction of the camera 504, the camera 501 transmits a gait authentication instruction to the camera 502 and the camera 503. Because the gait authentication instruction is not made to the camera 504, its resources can be used to detect another human body and authenticate the face of the human body, enabling detection processing to be performed at a high speed or with high accuracy.

FIG. 4 shows results of recognition processing performed on images captured by a plurality of cameras shown in FIG. 3.

FIGS. 4A to 4D are images captured by the cameras 501 to 504.

Figure 4A:
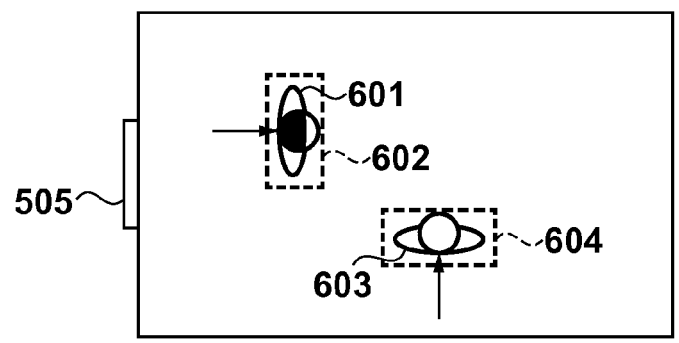
FIG. 4A is a diagram illustrating processing of an image captured by a camera.

In FIG. 4A (an image captured by the camera 501), a human body 601 is moving from the door toward the side opposite to the door, and the human body 603 is moving from the right side toward the left side as viewed from the door 505. A rectangle 602 is a human body region of the human body 601 detected as a result of the camera 501 performing moving body detection on the image captured, and then performing human body detection processing on the detected moving body detection region. A rectangle 604 is a human body region of the human body 603 obtained in the same manner as above.

Figure 4B:
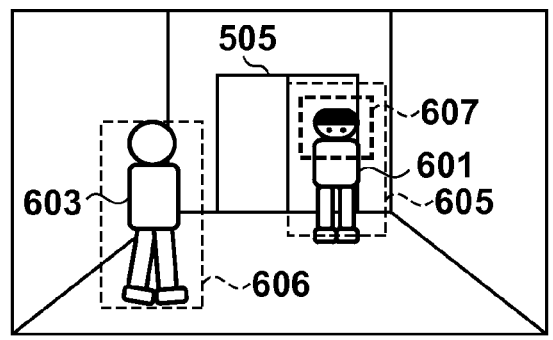
FIG. 4B is a diagram illustrating processing of an image captured by a camera.

In FIG. 4B (an image captured by the camera 502), a rectangle 605 is a human body region of the human body 601 detected as a result of the camera 502 performing human body detection processing. A rectangle 606 is a human body region of the human body 603 detected as a result of the camera 502 performing human body detection processing. A rectangle 607 is a face region of the human body 601 detected as a result of the camera 502 performing face detection processing.

Figure 4C:
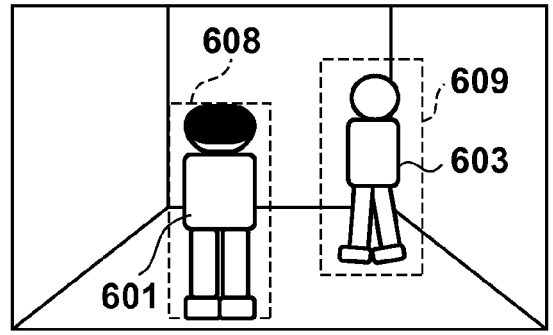
FIG. 4C is a diagram illustrating processing of an image captured by a camera.

In FIG. 4C (an image captured by the camera 503), a rectangle 608 is a human body region of the human body 601 detected as a result of the camera 503 performing human body detection processing. A rectangle 609 is a rectangular human body region of the human body 603 detected as a result of the camera 503 performing human body detection processing.

Figure 4D:
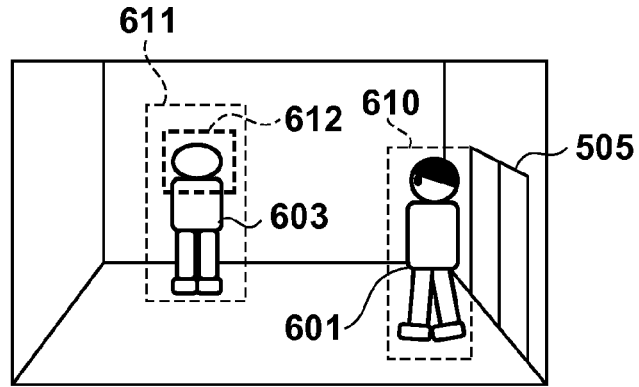
FIG. 4D is a diagram illustrating processing of an image captured by a camera.

In FIG. 4D (an image captured by the camera 504), a rectangle 610 is a rectangular human body region of the human body 601 detected as a result of the camera 504 performing human body detection processing. A rectangle 611 is a rectangular human body region of the human body 603 detected as a result of the camera 504 performing human body detection processing. A rectangle 612 is a face region of the human body 603 detected as a result of the camera 504 performing face detection processing.

Reference is made back to the description of FIG. 2.

In the detection processing setting unit 209, settings have been made to perform human body detection to detect a human body, and perform face detection/face authentication to detect and authenticate the face of the human body. With the settings, it is assumed that the human body 601 has been detected as shown in FIG. 4A. In this case, the camera selection unit 205 of the camera 501 selects the camera 502 located in front of the human body 601 in the moving direction of the human body 601 based on the setting values stored in the settings storage unit 207. Then, the camera 501 transmits a detection processing change instruction from the communication unit 208 to the camera 502 to perform face detection processing and face authentication processing. The image captured by the camera 502 is as shown in FIG. 4B.

Likewise, the camera 501 selects the camera 504 located in front of the human body 603 in the moving direction of the human body 603 based on the setting values stored in the settings storage unit 207, in order to perform face detection processing and face authentication processing on the human body 603. Then, the camera 501 transmits a detection processing change instruction from the communication unit 208 to the camera 504 to perform face detection processing and face authentication processing. The image captured by the camera 504 is as shown in FIG. 4D.

Meanwhile, the camera 503 is installed in a direction in which none of the human bodies is facing. Accordingly, the camera 501 transmits a detection processing change instruction to the camera 503 to not perform (to prohibit) face detection processing and face authentication processing. This detection processing change instruction is transmitted only when the object orientation estimation unit 204 detects that the moving direction of the human body has been changed or when the human body is no longer detected. Also, even if the camera 503 performs face detection processing and face authentication processing, the camera 503 does not capture any human body head-on, and therefore, the PC 106 may determine that the reliability of the result of the face detection processing and face authentication processing performed by the camera 503 is lower than the reliability of the results of face detection processing and face authentication processing performed by the cameras 501 and 502, upon receiving the results thereof.

Figure 5:
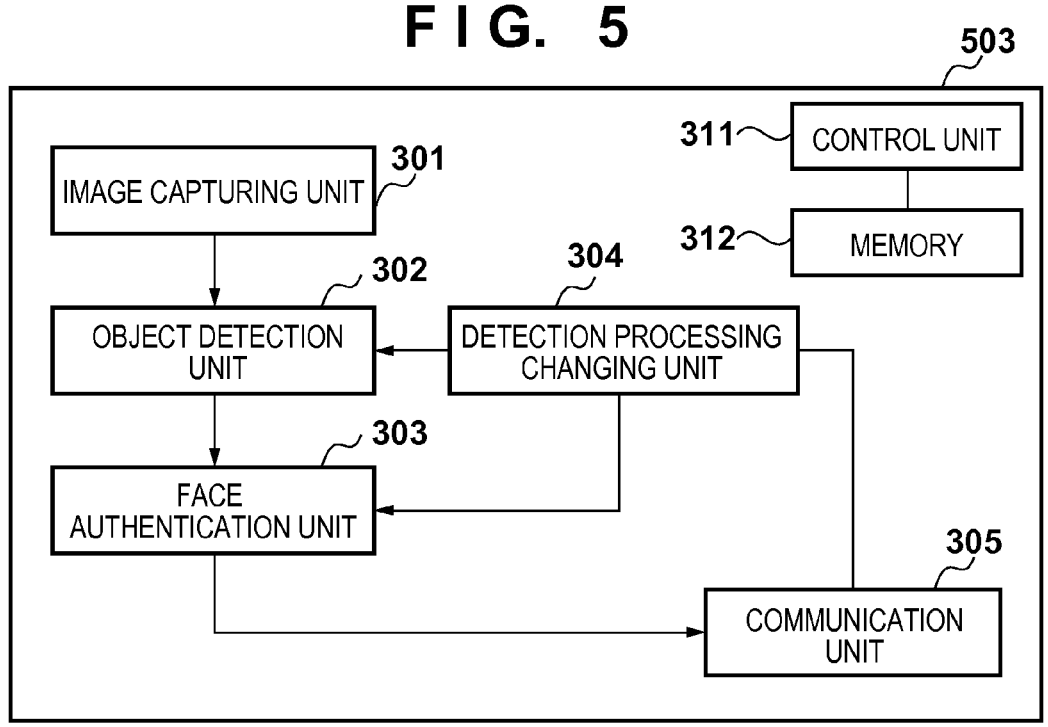
FIG. 5 is a diagram showing a functional configuration of a camera 502.
Figure 6:
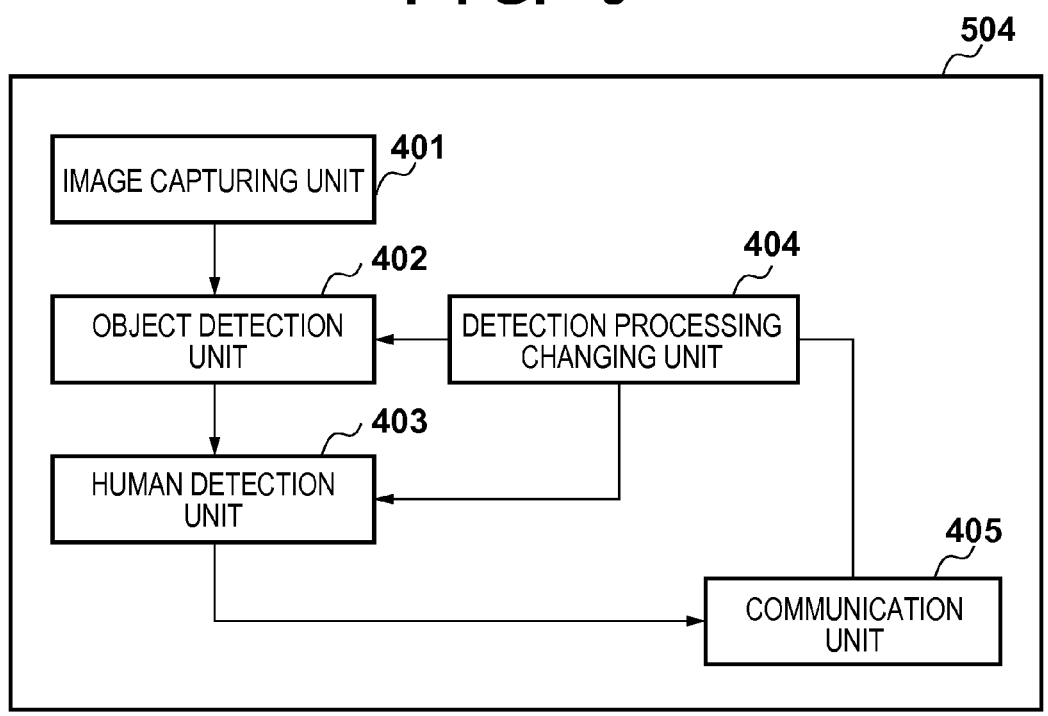
FIG. 6 is a diagram showing a functional configuration of a camera 503.

Next is a description of processing performed by the cameras 502 and 503 upon receiving a detection processing change instruction from the camera 501, with reference to FIGS. 5 and 6.

FIG. 5 is a block diagram showing a functional configuration of the camera 502 according to Embodiment 1, and FIG. 6 is a block diagram showing a functional configuration of the camera 503 according to Embodiment 1.

In FIG. 5, an image capturing unit 301, an object detection unit 302, a detection processing changing unit 304, and a communication unit 305 respectively correspond to the image capturing unit 201, the object detection unit 202, the detection processing changing unit 206, and the communication unit 208 shown in FIG. 2, and thus a description thereof is omitted here. In FIG. 5, a face authentication unit 303 is provided. Accordingly, the camera 502 includes a plurality of types of detection units (second detection units) for detecting an object and a human face that are implemented by the object detection unit 302 and the face authentication unit 303. Reference numeral 311 is a control unit that performs overall control on the network camera 502, and reference numeral 312 is a memory in which a program of the control unit 311, which is a computer, is held in a manner readable by the control unit 311.

In FIG. 6, an image capturing unit 401, an object detection unit 402, a human detection unit 403, a detection processing changing unit 404, and a communication unit 405 respectively correspond to the image capturing unit 201, the object detection unit 202, the human detection unit 203, the detection processing changing unit 206, and the communication unit 208 shown in FIG. 2, and thus a description thereof is omitted here. Accordingly, the camera 503 includes a plurality of types of detection units (second detection units) for detecting an object and a human body that are implemented by the object detection unit 402 and the human detection unit 403. The camera 503 may include a face authentication unit that detects and authenticates a human face. Also, the camera 502 may include a human detection unit that detects a human body. Reference numeral 411 is a control unit that performs overall control on the network camera 503, and reference numeral 412 is a memory in which a program of the control unit 411, which is a computer, is held in a manner readable by the control unit 411.

With the face authentication unit 303 shown in FIG. 5, the processing for determining whether or not to perform face detection is changed based on a detection processing change instruction sent from the detection processing changing unit 304. The detection processing change instruction is transmitted from the communication unit 208 of the camera 501 to the camera 502, received by the communication unit 305 of the camera 502, and then transmitted to the detection processing changing unit 304.

At this time, the camera 501 has detected human bodies as shown in FIG. 4A, and thus the camera 501 transmits face authentication processing instruction to the camera 502 installed in a direction in front of the human body 601. The camera 503, on the other hand, is installed in a side direction of the human body 603 detected by the camera 501, and thus a face authentication processing instruction is not transmitted from the camera 501 to the camera 503 (transmission of the face authentication processing instruction is prohibited).

In response to the face authentication processing instruction from the detection processing changing unit 304, the face authentication unit 303 performs face authentication processing. The camera 502 transmits the result of detection by the object detection unit 302 and the result of authentication by the face authentication unit 303 to the PC 106 via the communication unit 305. On the other hand, in the camera 503, a face detection processing change instruction is not transmitted from the detection processing changing unit 404, human body detection processing is performed by the human detection unit 403. Then, the result of the human body detection processing is transmitted to the PC 106 via the communication unit 405.

In this way, in the face detection, based on the orientation of the target human body (the direction in which the human body is facing (such as front direction)), orientation information that indicates the orientations of human bodies suitable for each detection function is previously defined, and the orientation information and camera installation information are managed by the settings storage unit 207. Then, by referring to the information managed by the settings storage unit 207, a camera optimal for the designated detection processing can be selected.

In Embodiment 1, the camera that performs secondary detection processing (face authentication processing) performs face authentication processing on the entire region corresponding to the full screen without performing processing such as narrowing the detection region. However, a region where face authentication (face detection) processing is performed may be limited from among a plurality of human body regions detected by the second camera based on the detected position of the human body detected by the first camera. For example, the camera 501 may instruct the camera 502 to exclude a region other than a region including the region 607 located slightly right of the center of the captured image, from the target region where face authentication processing is performed.

Also, the plurality of cameras know their positions in advance by the position information, and thus a region to which an arbitrary region in an image captured by one camera corresponds is estimated in an image captured by another camera. In the case of the example shown in FIG. 4, in FIG. 4D (an image captured by the camera 504), two rectangular human body regions, namely, a rectangle 610 and a rectangle 611 are detected as a result of human body detection. At this time, the camera 501 recognizes that the human body indicated by the rectangle 610 is moving toward the camera 504, and the human body indicated by the rectangle 611 is moving from the right direction to the left direction as viewed from the camera 504. Accordingly, in another embodiment, the camera 501 instructs the camera 504 to perform face authentication processing only on the region of the rectangle 611.

By utilizing the above, the speed of processing of the second camera can be increased by configuring the first camera and the second camera so as to have the same specific object recognition function.

This will be described taking a case where the first camera and the second camera are cameras each including an object orientation estimation unit and a face authentication unit, as an example. If the first camera (for example, the camera 501) cannot perform face authentication processing due to the fact that it cannot capture the detected human body head-on, and thus can acquire only the moving direction of the human body, the first camera instructs a camera located in front of the human body in the moving direction of the human body to perform face authentication processing. At this time, the processing can be performed at a high speed by performing face authentication on a limited region in an image captured by the second camera, the limited region corresponding to the captured region in which the object (human body) detected by the first camera is present. Alternatively, if the first camera obtains the result of face authentication performed by the second camera on a captured region other than a captured region corresponding to the captured region in which the object detected by the first camera is present, the first camera may notify the PC 106 (or the second camera), which is to receive a result of authentication by the second camera, of the fact that the reliability of the result of face authentication performed by the second camera on that region is low.

There is another effect obtained by configuring the first camera and the second camera to have the same specific object recognition function, specifically, an increased processing speed by saving the detection processing of the second camera. The first camera detects an object orientation and instructs the second camera to perform face authentication processing, but at this time, the first camera may instruct cameras other than the second camera to not perform (to prohibit) face authentication processing, it is thereby possible to increase the speed of processing of the second camera. Also, it is possible to determine the reliability of each of the results of processing of images captured by a camera that captures the front of the object, a camera that captures a side of the object, and a camera that captures the back of the object.

As described above, by configuring the first camera and the second camera to have the same configuration, any camera can function as the first camera from among a plurality of cameras installed. That is, a camera that first estimates the direction of the object functions as the first camera, and a camera that receives an instruction from the first camera functions as the second camera. Also, in Embodiment 1, the number of the first camera is one, but the first camera may be a group of a plurality of cameras. In this case, the direction of the object may be estimated based on the results of object detection performed by a plurality of cameras and the trajectories of movement of the object obtained from the cameras. With this configuration, the entire monitored space can be captured by the plurality of cameras, and a camera at the installation location optimal for the designated detection function can be selected as the second camera.

Figure 7:
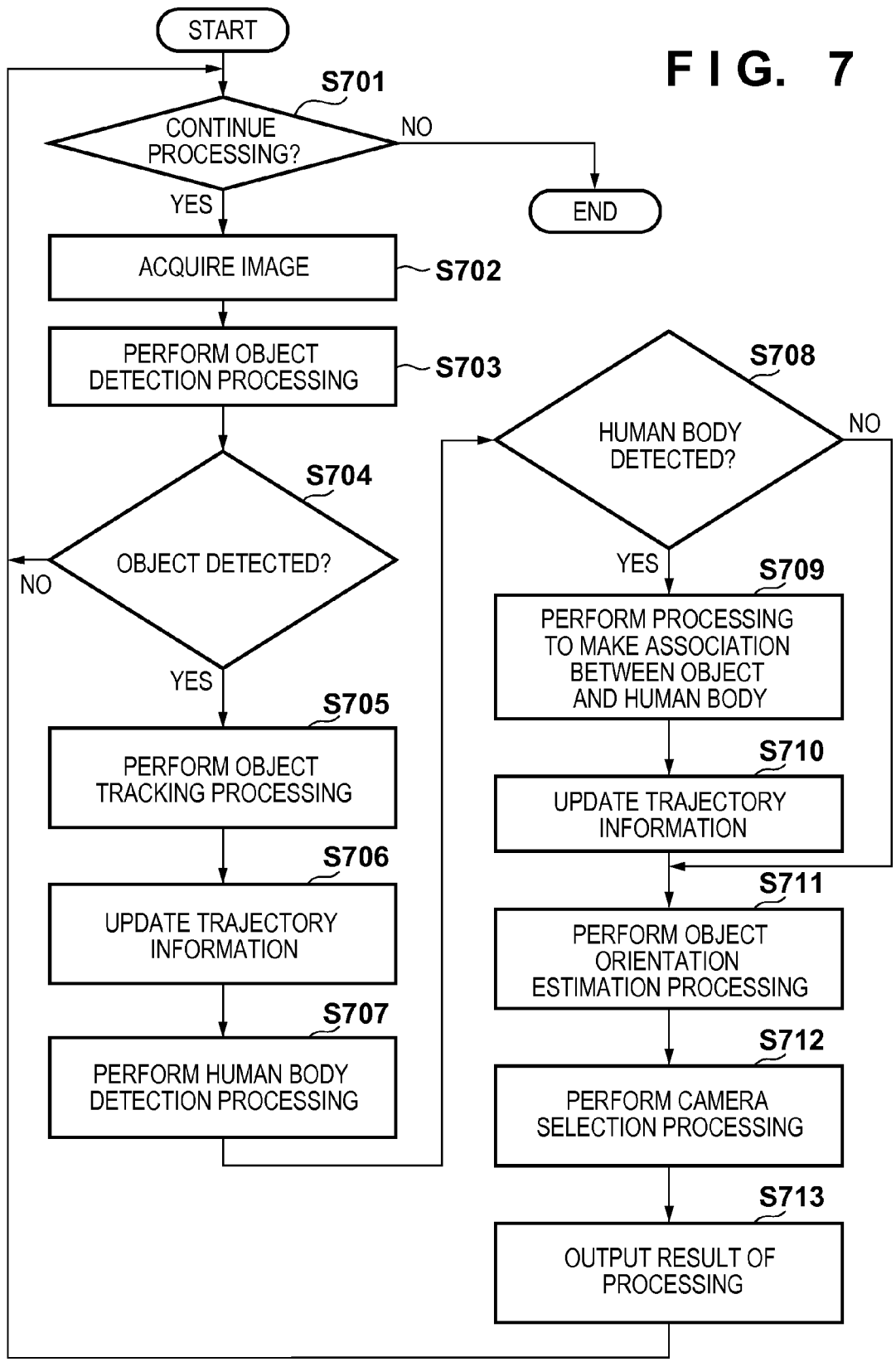
FIG. 7 is a flowchart illustrating a procedure of processing performed by a first camera.

Next is a description of a procedure of processing executed by the network camera 101 (for example, the camera 501) that is the first camera according to Embodiment 1, with reference to a flowchart shown in FIG. 7.

It is assumed that the above-described camera installation information is already stored in the settings storage unit 207 of the network camera 101 at the time when the processing illustrated by the flowchart starts.

In step S701, the control unit 211 of the network camera 101 determines whether or not to continue the processing. For example, the determination as to whether or not to continue the processing is made based on whether or not an instruction to end the processing has been received by the PC 106 from the user. If it is determined that the processing is to be continued (YES in step S701), the procedure advances to step S702. If, on the other hand, it is determined that the processing is to be finished (NO in step S701), the processing ends.

In step S702, the image capturing unit 201 acquires an image.

In step S703, the object detection unit 202 performs object detection processing on the acquired image. In step S704, the object detection unit 202 determines whether or not an object has been detected in step S703. If it is determined that an object has been detected (YES in step S704), the procedure advances to step S705. If, on the other hand, it is determined that an object has not been detected (NO in step S704), the procedure returns to step S701.

In step S705, an object tracking unit (not shown) provided in the network camera 101 performs object tracking processing. In step S706, the object tracking unit updates trajectory information that indicates the trajectory of movement of each object according to the result of object tracking processing performed in step S705. The trajectory information may be stored in the memory 212. In step S707, the human detection unit 203 performs human body detection processing based on the setting values (human body detection setting values) set in the detection processing setting unit 209.

In step S708, the human detection unit 203 determines whether or not a human body has been detected based on the result of human body detection performed in step S707. If it is determined that a human body has been detected (YES in step S708), the procedure advances to step S709. If, on the other hand, it is determined that a human body has not been detected (NO in step S708), the procedure advances to step S711.

In step S709, the control unit 211 performs processing for making an association between the detected object and the detected human body. In step S710, the object tracking unit updates the trajectory information based on the result of association processing performed in step S709. The fact that the tracked object is a human body is added to the trajectory information of the object. In step S711, the object orientation estimation unit 204 performs object orientation estimation processing on the detected object, or performs human body orientation estimation processing on the detected human body.

In step S712, the camera selection unit 205 performs camera selection processing for selecting a camera corresponding to the object orientation based on the object orientation or the human body orientation estimated in step S711 and the camera installation information stored in the settings storage unit 207. In step S713, the communication unit 208 transmits the result of processing and a secondary detection processing instruction (detection processing change instruction) to the camera selected in step S712, and the procedure returns to step S701. In another embodiment, a camera suitable for detection and a camera not suitable for detection are transmitted to the PC 106 according to the orientation of the object.

Figure 8:
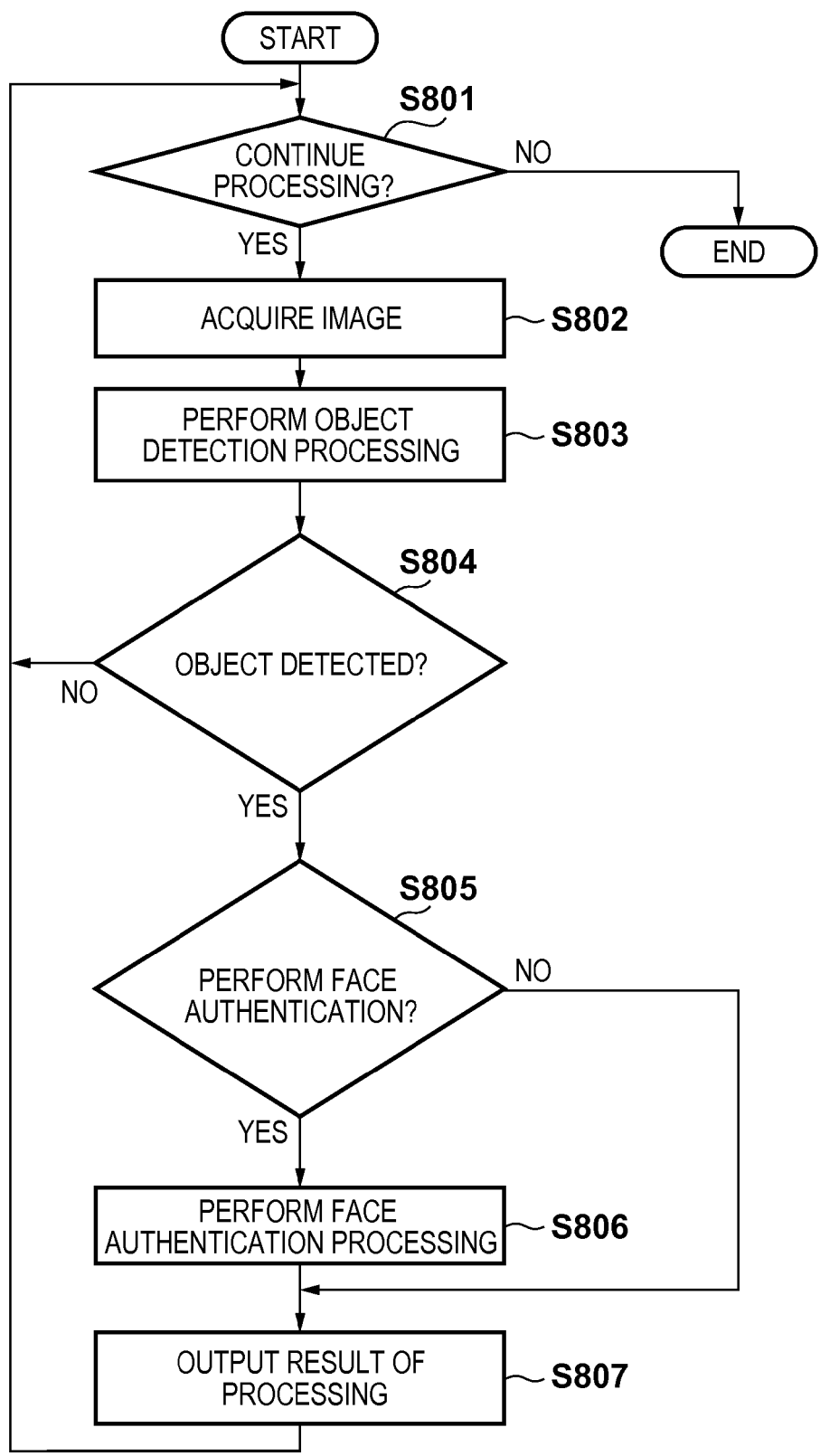
FIG. 8 is a flowchart illustrating a procedure of processing performed by a second camera.

Next, a procedure of processing executed by the network camera 102 (for example, the camera 502) that is a second camera according to Embodiment 1 will be described with reference to a flowchart shown in FIG. 8. The description will be given with reference to FIG. 5 on the assumption that the network camera 102 has the same configuration as the camera 503 shown in FIG. 5.

In step S801, the control unit 311 of the network camera 102 determines whether or not to continue the processing. For example, the determination as to whether or not to continue the processing is made based on whether or not an instruction to end the processing has been received by the PC 106 from the user. If it is determined that the processing is to be continued (YES in step S801), the procedure advances to step S802. If, on the other hand, it is determined that the processing is to be finished (NO in step S801), the processing ends.

In step S802, the image capturing unit 301 acquires an image.

In step S803, the object detection unit 302 performs object detection processing on the acquired image. In step S804, the object detection unit 302 determines whether or not an object has been detected in step S803. If it is determined that an object has been detected (YES in step S804), the procedure advances to step S805. If, on the other hand, it is determined that an object has not been detected (NO in step S804), the procedure returns to step S801.

In step S805, the control unit 311 determines whether or not to perform face authentication based on a detection processing change instruction of the detection processing changing unit 304. The detection processing change instruction of the detection processing changing unit 304 is obtained from the network camera 101 via the communication unit 305. If it is determined that face authentication is to be performed (YES in step S805), then in step S806, the face authentication unit 303 performs face authentication processing. If, on the other hand, it is determined that face authentication is not to be performed (NO in step S805), the procedure advances to step S807. In step S807, the communication unit 305 transmits the result of processing to the PC 106, and the procedure returns to step S801.

Note that, in Embodiment 1, human body detection processing is performed to estimate the orientation of the human body that is as an object, but the object is not limited to the human body, and the same processing can be performed to specify the orientation of an object other than the human body such as an automobile or an animal.

In the case of an automobile, for example, a detection instruction for detecting the number plate is transmitted from a camera that is capturing the automobile from above to a camera installed in a direction of the front or back of the automobile. In the case of a camera facing the front side of the automobile, the camera can capture the face of the driver and the face of the passenger, and thus an instruction to also perform face detection and face authentication can be transmitted to that camera. In the case of a camera installed in a side direction of the automobile, the camera can detect the speed of the automobile or a specific image of, for example, the logo of a commercial truck or vehicle, and thus an instruction to detect and authenticate such a specific image can be transmitted to that camera. Furthermore, in the case of speed detection, highly accurate speed detection processing can be performed by transmitting instructions to a plurality of cameras (in the case where the second camera includes a plurality of cameras). For example, a detection instruction for detecting a traffic jam can be transmitted to a camera installed above an automobile. Even if the camera that transmits instructions is not located in the capture direction (i.e., is not the one installed above the automobile), the processing can be performed in the same manner. For example, processing is possible in which a camera capturing the automobile from a side direction detects the orientation of the automobile and transmits a detection instruction to detect the number plate of the automobile to a camera located in the direction of movement of the automobile.

It is also possible to calculate the speed of the automobile by performing speed detection on images captured by a plurality of cameras, and combining the results of speed detection based on the images captured by the cameras according to the direction in which each camera is capturing the automobile.

Also, in Embodiment 1, the object orientation is estimated by the object orientation estimation unit 204, but the state of the object may be estimated. As used herein, the state of the object refers to, in the case of a human body, changes in the posture of the human body such as crouching, stumbling, bending forward, and raising hand. The detection accuracy can be improved by, for example, the first camera estimating the posture of the human body and the second camera using (selecting) matching patterns (dictionary) according to the estimated posture. Alternatively, a configuration is also possible in which the first camera estimates the posture of the human body and the second camera changes the type of object to be detected according to the estimated posture or interrupts the processing until the posture becomes a normal posture.

Also, in Embodiment 1, the camera selection processing is performed immediately after detection of the orientation of the human body by the first camera, but the camera selection processing may be performed only when a predetermined state (for example, a state in which the orientation is fixed) continues for a predetermined length of time. It is thereby possible to prevent the matching patterns (dictionary) of the second camera from being changed frequently, or reduce the control time such as the time required to switch the matching patterns (dictionary).

As described above, according to Embodiment 1, by selecting a camera that performs secondary detection processing according to the moving direction, the camera that performs secondary detection processing executes the designated detection processing only when a detection instruction is received. Accordingly, when a detection instruction is not received, the resources of the CPU and the like can be used in another detection processing. With this configuration, the image recognition processing of the image processing system by a plurality of cameras can be performed with high accuracy or at a high speed.

Next is a description of Embodiment 2 in which the matching patterns (dictionary) for detecting a human body of the second camera are changed according to the orientation of the object. According to Embodiment 2, by changing the matching patterns as described above, the human body detection processing by the image processing system can also be performed at a high speed.

Embodiment 2 will be described focusing on the differences from Embodiment 1, and thus the present embodiment is the same as Embodiment 1 unless otherwise stated.

The camera positioning and the internal configurations are the same as those shown in FIGS. 2, 3, 5 and 6. However, the cameras 501 to 504 include a human detection unit, and a memory 312 in which a plurality of types of matching patterns (dictionary) for detecting an orientation for detecting a human body. As used herein, "a plurality of types of matching patterns (dictionary)" refer to matching patterns (dictionary) for detecting the front, back, right side, and the left side of a human body. Each camera performs human body detection processing by using at least one of the matching patterns (dictionary). Furthermore, in the detection processing setting unit 209, settings have been made such that all cameras perform human body detection processing. It is assumed that, in that state, a human body 901 has been detected as shown in FIG. 9.

FIG. 9A is an image captured by the camera 501, and FIG. 9B is an image captured by the camera 502 at the same instant.

In FIG. 9A, the human body 901 is moving from the right direction to the left direction as viewed from the door 505. At this time, the camera 502 captures the human body 901 as a human body 902 (FIG. 9B).

The procedure of processing executed by the camera 501 (for example, image analysis processing upon detection of an object, or the like) is the same as that of the flowchart shown in FIG. 7 of Embodiment 1. After start of the processing, processing in steps S701 to S711 is performed. Next, in step S712, the camera selection unit 205 performs camera selection processing. In the detection processing setting unit 209, settings have been made such that human body detection processing is performed by all remaining cameras 502 to 504. Accordingly, the communication unit 208 transmits, to the all remaining cameras 502 to 504, a human body detection processing instruction (detection processing change instruction) to perform secondary detection processing (human body detection processing) and human orientation information indicating the detected orientation of the human body. The cameras 502 to 504 include a human detection unit.

In FIG. 9B, the camera 502 receives the human body detection processing instruction and the human orientation information from the communication unit 305. The detection processing changing unit 304 changes the matching patterns (dictionary) for human body detection to be used according to the orientation of the human body indicated by the received human orientation information. In FIG. 9B showing an image captured by the camera 502, the human body is moving from the left to the right, and thus the camera 502 uses only matching patterns (dictionary) for right side orientation from among the plurality of matching patterns (dictionaries) stored, so as to perform human body detection processing. At this time, the camera 503 uses only matching patterns (dictionary) for left side orientation so as to perform human body detection processing, based on the moving direction of the human body. The camera 504 uses matching patterns (dictionary) for front orientation so as to perform human body detection processing, based on the moving direction of the human body. A configuration is also possible in which priorities are assigned to the dictionaries to be used: for example, if the camera 502 does not detect a human body as a result of performing human body detection by using the dictionary for right side orientation, the camera 502 performs human body detection by using the dictionary for front orientation.

Another example of Embodiment 2 will be described with reference to FIG. 10.

FIG. 10A is an image captured by the camera 501, and FIG. 10B is an image captured by the camera 502 at the same instant.

The camera 501 detects that the human body 1001 that was moving from the left direction to the right direction as viewed from the door 505 has changed its moving direction and is moving toward the back direction (FIG. 10A). Also, it is assumed that the camera 502 that performs secondary detection processing has the configuration shown in FIG. 5.

In FIG. 10B, the camera 502 receives the human body detection processing instruction and the human orientation information from the communication unit 305. The detection processing changing unit 304 changes the matching patterns (dictionary) for human body detection to be used according to the orientation of the human body indicated by the received human orientation information.

In FIG. 10B showing an image captured by the camera 502, the human body is moving from the back of the screen toward the front, and thus the camera 502 uses only matching patterns (dictionary) for front orientation from among the plurality of stored dictionaries so as to perform human body detection processing.

At this time, the camera 503 uses only matching patterns (dictionary) for back side so as to perform human body detection processing, based on the moving direction of the human body. The camera 504 uses matching patterns (dictionary) for left side so as to perform human body detection processing, based on the moving direction of the human body.

As described above, according to Embodiment 2, by changing the matching patterns (dictionary) of the second camera according to the orientation of the object, the human body detection processing by the image processing system can be performed at a high speed or with high accuracy.

Next is a description of Embodiment 3. The present embodiment will be described focusing on the differences from Embodiment 1, and thus the present embodiment is the same as Embodiment 1 unless otherwise stated.

Figure 11:
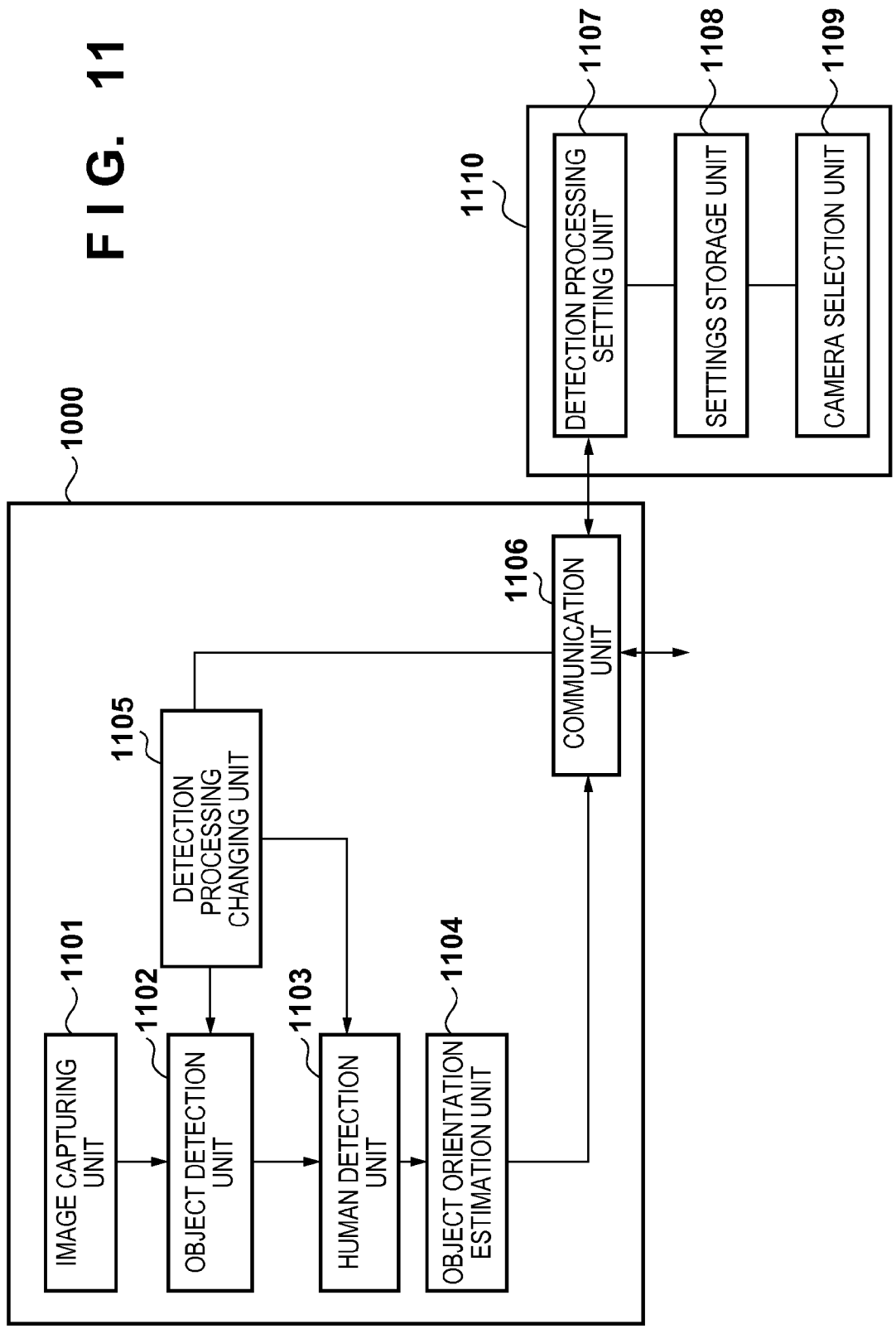
FIG. 11 is a diagram showing a functional configuration of a network camera.

FIG. 11 is a block diagram showing a configuration of a network camera 1000 and an information processing apparatus 1110 according to Embodiment 3.

In FIG. 11, the information processing apparatus 1110 is a processing apparatus such as a personal computer (PC) and is connected to the network camera 1000 via a network. The information processing apparatus 1110 includes a detection processing setting unit 1107, a settings storage unit 1108, and a camera selection unit 1109.

In Embodiment 1, the network camera 1000 selects a camera that performs secondary detection processing according to the moving direction. In Embodiment 3, the externally provided information processing apparatus 1110 receives an object orientation detected by the camera 1000, and performs camera selection processing (camera selection unit) according to camera installation information stored in the settings storage unit 1108.

In the configuration of Embodiment 3, the camera selection unit 1109 and the settings storage unit 1108 are included in the externally provided information processing apparatus 1110. Upon object orientation information being transmitted by an object orientation estimation unit 1104 to the information processing apparatus 1110, the information processing apparatus 1110 selects a camera that next performs detection processing (secondary detection processing) based on the camera installation information in the settings storage unit 1108 and the object orientation information of the object orientation estimation unit 1104. Alternatively, the information processing apparatus 1100 selects the detection dictionary of the camera that next performs secondary detection processing. Then, detection processing setting information is transmitted to the camera that next performs secondary detection processing. It is also possible to estimate the moving direction of the object through tracking by using a sensor that can acquire the position of the object. Also, the orientation of the object may be estimated by the information processing apparatus 1110 receiving an image captured by the network camera 1000.

Also, the information processing apparatus 1110 may select the dictionary used to analyze an image captured by a camera other than the camera 1000 according to the orientation estimated by the camera 1000 or the information processing apparatus 1110. Also, the information processing apparatus 1110 may combine the results of object detection performed on images captured by the plurality of cameras according to the orientation of the object.

As described above, according to Embodiment 3, in addition to the effects described in Embodiments 1 and 2, a camera that performs secondary detection processing can be selected appropriately by an externally provided information processing apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-080839, filed on Apr. 8, 2013, which is hereby incorporated by reference herein in its entirety.

What is claimed is:

1. An image analysis method for analyzing images captured by a plurality of cameras, the method comprising:
   detecting a state of an object independently of results of analysis of images captured by the plurality of cameras; and
   controlling analysis of images captured by the plurality of cameras concurrently capturing the object whose state has been detected, according to the state of the object.

2. The image analysis method according to claim 1, wherein the state of the object is an orientation of the object.

3. The image analysis method according to claim 1, wherein analysis for detecting a specific object from the images captured by the plurality of cameras is controlled according to the state of the object.

4. The image analysis method according to claim 1, wherein the state of the object is detected from an image captured by a camera other than the plurality of cameras.

5. The image analysis method according to claim 1, wherein the analysis of the images captured by the plurality of cameras is controlled according to the state of the object and installation positions of the plurality of cameras.

6. The image analysis method according to claim 1, wherein an image for obtaining a result of image analysis is selected from among the images captured by the plurality of cameras according to the state of the object.

7. The image analysis method according to claim 1,
wherein a type of analysis processing performed on each of the images captured by the plurality of cameras is set according to the state of the object.

8. The image analysis method according to claim 1,
wherein a pattern used to analyze the images captured by the plurality of cameras is selected according to the state of the object.

9. The image analysis method according to claim 1,
wherein a position of the object is detected independently of a result of analysis of the images captured by the plurality of cameras, and the analysis of the images captured by the plurality of cameras is controlled according to the position of the object.

10. A camera apparatus that controls a plurality of cameras, the camera apparatus comprising:
an image capturing unit;
a detection unit configured to detect a state of an object in an image captured by the image capturing unit; and
a control unit configured to control analysis of the images captured by the plurality of cameras concurrently capturing the object whose state has been detected, according to the state of the object.

11. The camera apparatus according to claim 10,
wherein the control unit sets a type of analysis processing performed on each of the images captured by the plurality of cameras according to the state of the object.

12. The camera apparatus according to claim 10,
wherein the control unit selects a pattern used to analyze the images captured by the plurality of cameras according to the state of the object.

13. A control apparatus that controls a plurality of cameras, the control apparatus comprising:
an acquisition unit configured to acquire a state of an object detected independently of results of analysis of images captured by the plurality of cameras via a network; and
a control unit configured to control analysis of the images captured by the plurality of cameras concurrently capturing the object whose state has been detected, according to the state of the object.

14. The control apparatus according to claim 13,
wherein the control unit selects a pattern used to analyze the images captured by the plurality of cameras according to the state of the object.

15. A control method for controlling a plurality of cameras by a camera apparatus, the control method comprising:
detecting a state of an object in an image captured by an image capturing unit of the camera apparatus; and
controlling analysis of images captured by the plurality of cameras concurrently capturing the object whose state has been detected, according to the state of the object.

16. The control method according to claim 15,
wherein a type of analysis processing performed on each of the images captured by the plurality of cameras is set according to the state of the object.

17. The control method according to claim 15,
wherein a pattern used to analyze the images captured by the plurality of cameras is selected according to the state of the object.

18. A control method for controlling a plurality of cameras by a control apparatus, the control method comprising:
acquiring a state of an object detected independently of results of analysis of images captured by the plurality of cameras via a network; and
controlling analysis of the images captured by the plurality of cameras concurrently capturing the object whose state has been detected, according to the state of the object.

19. The control method according to claim 18,
wherein a pattern used to analyze the images captured by the plurality of cameras is selected according to the state of the object.

20. A non-transitory computer-readable storage medium storing a computer program for causing a computer to execute a method for controlling a plurality of cameras by a camera apparatus, the method comprising:
detecting a state of an object in an image captured by an image capturing unit of the camera apparatus; and
controlling analysis of the images captured by the plurality of cameras concurrently capturing the object whose state has been detected, according to the state of the object.

21. The non-transitory computer-readable storage medium according to claim 20, wherein a type of analysis processing performed on each of the images captured by the plurality of cameras is set according to the state of the object.

22. The non-transitory computer-readable storage medium according to claim 20, wherein a pattern used to analyze the images captured by the plurality of cameras is selected according to the state of the object.

23. A non-transitory computer-readable storage medium storing a computer program for causing a computer to execute a method for controlling a plurality of cameras by a camera apparatus, the method comprising:
acquiring a state of an object detected independently of results of analysis of images captured by the plurality of cameras via a network; and
controlling analysis of the images captured by the plurality of cameras concurrently capturing the object whose state has been detected, according to the state of the object.

24. The non-transitory computer-readable storage medium according to claim 23, wherein a pattern used to analyze the images captured by the plurality of cameras is selected according to the state of the object.

25. A control apparatus that controls a plurality of cameras placed at a plurality of positions to capture an object concurrently from a plurality of directions, the control apparatus comprising:
an acquisition unit configured to acquire a state of the object captured by one of the plurality of cameras via a network; and
a control unit configured to control analysis of images captured by the plurality of cameras other than the one of the plurality of cameras which captures the object whose state is acquired, according to the state of the object.

26. The control apparatus according to claim 25, wherein the control unit selects a pattern used to analyze the images captured by the plurality of cameras according to the state of the object.

27. A method for controlling a plurality of cameras placed at a plurality of positions to capture an object concurrently from a plurality of directions, the method comprising:
acquiring a state of the object captured by one of the plurality of cameras via a network; and
controlling analysis of images captured by the plurality of cameras other than the one of the plurality of cameras which captures the object whose state is acquired, according to the state of the object.

28. The method according to claim 27, wherein a pattern used to analyze the images captured by the plurality of cameras is selected according to the state of the object.

29. A non-transitory computer-readable storage medium storing a computer program for causing a computer to execute a method for controlling a plurality of cameras placed at a plurality of positions to capture an object concurrently from a plurality of directions, the method comprising:
   acquiring a state of the object captured by one of the plurality of cameras via a network; and
   controlling analysis of images captured by the plurality of cameras other than the one of the plurality of cameras which captures the object whose state is acquired, according to the state of the object.

30. The non-transitory computer-readable storage medium according to claim 29, wherein a pattern used to analyze the images captured by the plurality of cameras is selected according to the state of the object.

* * * * *